(12) United States Patent
Huang et al.

(10) Patent No.: US 6,168,694 B1
(45) Date of Patent: Jan. 2, 2001

(54) METHODS FOR AND PRODUCTS OF PROCESSING NANOSTRUCTURE NITRIDE, CARBONITRIDE AND OXYCARBONITRIDE ELECTRODE POWER MATERIALS BY UTILIZING SOL GEL TECHNOLOGY FOR SUPERCAPACITOR APPLICATIONS

(75) Inventors: Yuhong Huang; Oiang Wei, both of West Hills; Chung-tse Chu, Chatsworth; Haixing Zheng, Oak Park, all of CA (US)

(73) Assignee: Chemat Technology, Inc., Northridge, CA (US)

( * ) Notice: Under 35 U.S.C. 154(b), the term of this patent shall be extended for 0 days.

(21) Appl. No.: 09/244,815

(22) Filed: Feb. 4, 1999

(51) Int. Cl.⁷ .................................................... C25B 11/00
(52) U.S. Cl. ............................. 204/290.12; 204/290.15; 204/294; 204/291; 205/508; 205/431; 205/432; 205/433; 205/450; 205/457; 423/334; 423/365; 423/409; 106/287.26; 106/287.3; 361/502; 361/508; 361/509; 361/516; 361/528; 361/532; 148/206; 148/238; 501/96.1
(58) Field of Search .................................. 205/508, 431, 205/432, 433, 450, 457; 423/334, 365, 409; 106/287.26, 287.3; 361/502, 508, 509, 516, 528, 532; 148/206, 238; 501/96.1; 204/290 R, 290 F, 291, 290.12, 290.15, 294

(56) References Cited

U.S. PATENT DOCUMENTS

| | | |
|---|---|---|
| 3,977,993 | 8/1976 | Lynch . |
| 4,079,674 | 3/1978 | Malaspina . |
| 4,327,065 | 4/1982 | Dardel et al. . |
| 4,327,400 | 4/1982 | Muranaka . |
| 4,392,927 * | 7/1983 | Fabian et al. ............... 204/290 F |
| 4,426,336 | 1/1984 | McCandlish et al. . |
| 4,515,763 | 5/1985 | Boudart et al. . |
| 4,717,708 | 1/1988 | Cheng et al. . |
| 4,851,206 | 7/1989 | Boudart et al. . |
| 5,062,025 | 10/1991 | Verhoeven et al. . |
| 5,601,938 | 2/1997 | Mayer et al. . |
| 5,680,292 | 10/1997 | Thompson, Jr. . |
| 5,807,430 | 9/1998 | Zheng et al. . |
| 5,837,630 | 11/1998 | Ownes et al. . |

OTHER PUBLICATIONS

C.Z. Deng, P.A.J. Pynenburg, and K.C. Tsai, "Improved Porous Mixture . . . ", Electrochem. Soc. vol. 145, (Apr. 1998).

S.L. Roberson, D. Finello, R.F. David, T.Liu and B.E. Conway, The 7th International Seminar . . . (Dec. 8–10, 1997, Deerfield Beach, Florida).

* cited by examiner

Primary Examiner—Bruce F. Bell
(74) Attorney, Agent, or Firm—Thomas I. Roza; Tony D. Chen; Jerry Fong

(57) ABSTRACT

Metal nitride, carbonitride, and oxycarbonitride powder with high surface area (up to 150 m²/g) is prepared by using sol-gel process. The metal organic precursor, alkoxides or amides, is synthesized firstly. The metal organic precursor is modified by using unhydrolyzable organic ligands or templates. A wet gel is formed then by hydrolysis and condensation process. The solvent in the wet gel is then be removed supercritically to form porous amorphous hydroxide. This porous hydroxide materials is sintered to 725° C. under the ammonia flow and porous nitride powder is formed. The other way to obtain high surface area nitride, carbonitride, and oxycarbonitride powder is to pyrolyze polymerized templated metal amides aerogel in an inert atmosphere. The electrochemical capacitors are prepared by using sol-gel prepared nitride, carbonitride, and oxycarbonitride powder. Two methods are used to assemble the capacitors. Electrode is formed either by pressing the mixture of nitride powder and binder to a foil, or by depositing electrode coating onto metal current collector. The binder or coating is converted into a continuous network of electrode material after thermal treatment to provide enhanced energy and power density. Liquid electrolyte is soaked into porous electrode. The electrochemical capacitor assembly further has a porous separator layer between two electrodes/electrolyte and forming a unit cell.

31 Claims, 4 Drawing Sheets

US 6,168,694 B1

METHODS FOR AND PRODUCTS OF PROCESSING NANOSTRUCTURE NITRIDE, CARBONITRIDE AND OXYCARBONITRIDE ELECTRODE POWER MATERIALS BY UTILIZING SOL GEL TECHNOLOGY FOR SUPERCAPACITOR APPLICATIONS

This invention was made with Government support under contract DE-FG03-93ER81570 awarded by the Department of Energy. The Government has certain rights in this invention.

BACKGROUND OF THE INVENTION

1. Field of The Invention

The present invention generally relates to the field of methods for and products of manufacturing component parts in energy storage devices. More particularly, the present invention relates to the field of methods for and products of producing high surface area electrode by processing nitride, carbonitride, and oxycarbonitride materials for the application of supercapacitor.

2. Description of The Prior Art

The following is a list of prior art references that are believed to be pertinent to the field of methods for and products of producing high surface area electrode by processing nitride, carbonitride, and oxycarbonitride materials for the application of energy storage devices:

1. U.S. Pat. No. 5,837,630 issued on Nov. 17, 1998 to Owens et al. for "High Surface Area Mesopourous Desigel Materials and Methods for Their Fabrication" (hereafter "Owens");

2. U.S. Pat. No. 5,807,430 issued on Sep. 15, 1998 to Zheng et al. for "Method and Composition Useful Treating Metal Surfaces" (hereafter "Zheng");

3. U.S. Pat. No. 5,680,292 issued on Oct. 21, 1997 to Thompson, Jr. et al. for "High Surface Area Nitride, Carbide and Boride Electrodes and Methods of Fabrication Thereof" (hereafter "Thompson");

4. U.S. Pat. No. 5,601,938 issued on Feb. 11, 1997 to Mayer et al for "Carbon Aerogel Electrodes for Direct Energy Conversion" (hereafter "Mayer");

5. U.S. Pat. No. 5,079,674 issued on Jan. 7, 1992 to Malaspina for "Supercapacitor Electrode and Method of Fabrication Thereof" (hereafter "Malaspina");

6. U.S. Pat. No. 5,062,025 issued on Oct. 29, 1991 to Verhoeven et al. for "Electrolytic Capacitor and Large Surface Area Electrode Element Therefor" (hereafter "Verhoeven");

7. U.S. Pat. No. 4,851,206 issued on Jul. 25, 1989 to Boudart et al. for "Methods and Compositions Involving High Specific Surface Area Carbides and Nitrides" (hereafter "Boudart ('206)");

8. U.S. Pat. No. 4,717,708 issued on Jan. 5, 1988 to Cheng et al. for "Inorganic Oxide Aerogels and Their Preparation" (hereafter "Cheng");

9. U.S. Pat. No. 4,515,763 issued on May 1985 to Boudart et al. for "High Specific Surface Area Carbides and Nitrides" (hereafter "Boudart ('763)");

10. U.S. Pat. No. 4,426,336 issued on Jan. 17, 1984 to McCandlish et al. for "Novel Molybdenum Oxycarbonitride Compositions" (hereafter "McCandlish");

11. U.S. Pat. No. 4,327,400 issued on Apr. 27, 1982 to Muranaka et al. for "Electric Double Layer Capacitor" (hereafter "Muranaka"

12. U.S. Pat. No. 4,327,065 issued on Apr. 27, 1982 to von Dardel et al. for "Method of Preparing Silica Aerogel" (hereafter "von Dardel");

13. U.S. Pat. No. 3,977,993 issued on Aug. 31, 1976 to Lynch for "Metal Oxide Aerogels" (hereafter "Lynch");

14. C. Z. Deng, P. A. J. Pynenburg, and K. C. Tsai, "Improved Porous Mixture of Molybdenum Nitride and Tantalum Oxide as a Charge Storage Material", *J Electrochem. Soc.*, vol. 145, p. L61 (April 1998) (hereafter "Deng"); and 15. S. L. Roberson, D. Finello, R. F. Davis, T. Liu and B. E. Conway, *The 7th International Seminar on Double Layer Capacitors and Similar Energy Storage Devices* (Dec. 8–10, 1997, Deerfield Beach, Fla.) (hereafter "Roberson").

In general, electrochemical capacitors are capacitive energy storage devices based on double-layer capacitance or pseudocapacitance. The potential power density and cycle life of electrochemical capacitors are two orders of magnitudes higher than those of rechargeable batteries. As compared with batteries, electrochemical capacitors can be characterized as having low energy density, high power density and a high cycle life. Further, in an electric circuit, an electrochemical capacitor behaves more like a classical dielectric capacitor than a battery, hence its name.

The component parts of an electrochemical capacitor include electrode, electrolyte, seperator. Electrode material is a key element in electrochemical capacitor. The requirement of high energy and power density electrochemical capacitor intrigues development on miniaturization and weight reduction of electrochemical capacitor. One approach to increase energy and power density is to increase assessable surface area of electrode. The pore size must be large enough to let electrolyte assess into the pore, and smaller enough to have high surface area per volume or per weight of electrode material. The cohesion of electrode and adhesion to the current collector is a key point to realize high conductivity and power density of electrode materials, such as nitride. Contacting resistance can increase the resistance of the capacitor.

There are four basic types of electrode for supercapacitor application. Activated carbon or foam represents one type of electrode materials, as disclosed by Mayer, Malaspina, and Muranaka. Typical capacitance obtained from an electric double layer is in the range of 20~40 mF/cm$^2$.

Certain transition metal oxides such as $RuO_2$ and $IrO_2$ posses pseudocapacitance. Pseudocapacitance arise from highly reversible reactions, such as redox reactions, which occurs at or near the electrode surfaces. Capacitance of 150~200 mF/cm$^2$ have been observed for $RuO_2$ films.

The third type consists of metallic bodies which are mechanically or chemically etched to provide a roughened surface and high specific surface area, as disclosed by Verhoeven. High surface area metal electrode are limited by electrochemical stability. Metals are generally unstable in oxidizing environments, therefore their use is limited as to the positive, reducing electrode or anode.

The fourth type contains metal nitride. Metal nitride is in general conductive and exhibit pseudocapacitance. Especially molybdenum nitride, as pointed out by Roberson, exhibits high energy density.

Among these four types of electrode material, nitride electrode has great potential for supercapacitor application due its much higher energy density than carbon and metal, and similar energy density as $RuO_2$ with much low cost.

Various methods have been developed to produce high surface area of nitride materials. Owens disclosed a high surface area mesoporous desigel materials which are fabricated as nitrides, carbides, borides, and silicides of metals. Thompson disclosed a method to deposit oxide coating onto current collector followed by exposing the metal oxide layer at elevated temperature to a source of nitrogen, carbon or boron in a chemically reducing environment to form metal nitride, carbide and boride film.

Roberson disclosed a method to deposit Mo,N coating electrode via chemical vapor deposition (CVD).

McCandlish disclosed a molybdenum oxycarbonitride composition. The compositions have the general formula: MoOaCbNr, where a, b and c are non-zero decimal values and the sum: a+b+c, is less than or equal to about one (1). The compositions can be obtained by the relatively low temperature thermal decomposition of an anime molybdate and can be amorphous, poorly crystalline, or substantially crystalline and can possess high surface areas in the region of about 60 to 130 $m^2/g$.

It is desirable to provide a new type of composite electrode materials possessing nitride, carbonitride and oxycarbonitride aerogel and methods of fabrication thereof for supercapacitor applications.

SUMMARY OF THE INVENTION

In one aspect, the present invention relates to assembling an electrical storage device that has both a high energy and a high power density. It is a unique method for and product of processing nanostructure nitride, carbonitride and oxycarbonitride electrode powder materials by utilizing sol gel related technology. The pore size is controlled by incorporating unhydrolyzable organic ligands or templates into gel network, which is removed by pyrolysis. The pore size can be controlled by the size of templates and narrow pore size distribution is achieved.

It is an object of the present invention to provide new transition metal nitride, carbonitride, and oxycarbonitride electrode materials and methods to fabricate the same.

It is another object of the present invention to provide a composite electrode having therein powderized materials including metal nitride, carbonitride, oxycarbonitride or various form of carbon or dielectrical oxides.

It is a further object of the present invention to provide a method for producing metal nitride composite electrodes which involves a modification of prior known methods by nitridation of oxide coating.

Other objects and advantages will become apparent from the following description and accompanying drawing.

Described generally, the present invention comprise a composite of metal nitride, carbonitride, and oxycarbonitride in which is incorporated porous granularized materials and a method of fabricating same. Choice of materials to be used in the composite electrode will depend on the electrolyte used and the relative trade off of system resistivity and power to system energy. Nitride, carbide or metal powder may be added i 11 for increased conductivity, such may include nickel, stainless steel, aluminum, TiC, TiN, ZrC, ZrN, HfC, HfN, NbC, TaC, MoN, $Mo_2N$, WN and WC, as well as carbonitride of above metals, etc. The granularized materials, microspheres added to the precursor materials to provide high energy density may include: (1) metal nitride, carbonitride, and oxycarbonitride nanostructured microsphere; (2) crashed or powderized nanostructured metal nitride, carbonitride, and oxycarbonitride aerogel; (3) metal oxide microsphere or powder; (4) metal nitride, carbonitride, and oxycarbonitride aerosol microsphere or powder; and/or (5) metal oxide aerosol microsphere or powder. Some nitride or carbonitride materials can be added to increase both conductivity and specific capacitance.

The present invention method for fabrication composite electrode comprises the following basic steps:

(a) Fabrication of unhydrolyzable organic ligand or template modified wet gel:
  (i) Metal amide: metal amide wet gel is prepared by aminolysis of alkylamides followed by polymerization. The alkyl group is acted as template which is used to control the pore size;
  (ii) Metal alkoxide: hydrolysis of unhydrolyzable organic ligand or template modified metal alkoxides followed by polycondensation;

(b) Fabrication of porous powderized materials from metal amide wet gel:
The present invention provide a method for fabrication of porous electrode materials by sintered to high temperature in an inert or reduced atmosphere to remove templates from polymerized wet gel. The substantially nitride, carbonitride, and oxycarbonitride powder has a high surface area (up to 150 $n^2Ig$) and narrow pore size distribution;

(c) Fabrication of porous powderized materials from oxide aerogel powder
  (i) Oxide aerogel: oxide aerogel is a suitable way for synthesizing low density porous materials with high surface area. The preparation of oxide aerogels, in general and silica aerogels in particular, has been well documented in the art, see, e.g., Lynch, von Dardel, and Cheng. It has been known to produce such aerogels by hydrolyzing salts, or alkoxides, in the presence or absence of a catalyst, generally an acid or base, to form a gel which is washed with water and then solvent exchanged with an alcohol prior to drying in an autoclave at the critical temperature and pressure of the solvent;
  (ii) Using unhydrolyzable organic ligand or template modified wet gel: the template ligands incorporated into the gel will modify the gel surface chemistry so that the surface tension is drastically reduced or eliminated and the porous structure will preserved upon the removal of pore fluid under ambient pressure.
  (iii) Sintering aerogel powder: the aerogel is sintered to high temperature in an inert or reduced atmosphere. The substantially nitride, carbonitride, and oxycarbonitride powder has a high surface area (up to 150 $m^2/g$);

(d) Preparing composite coating: the cohesion of electrode and adhesion to current collector is an key fact to realize the high energy and power density of the capacitor. The present invention provide a method to deposit a composite coating onto current collector by spin-coat, dip-coat or spray coat, followed by heating to high temperature in an inert or reduced atmosphere.

In accordance with the present invention, an electrochemical capacitor is provided comprising an electrode material having a specific capacitance of 300 F/g, an energy density of 16 Wb/kg and a maximum power density of 1.4 kW/kg, as well as high chemical stability, which is competitive with ruthenium oxide crystalline electrode.

One of the unique features of the present invention is to utilize bulky organic ligand as template for controlling the pore size and pore size distribution in the powder to achieve a more diserable pore size and a much narrower pore size distribution.

The advantages of present invention include: (1) increasing the specific surface area of electrode material, therefore higher energy density, (2) enhancing cohesion of electrode and adhesion to the current collector, (3) manufacturability is enhanced by using more concentrated sol and less shrinkage; (4) comparing to conventional method using polymer based binder, the "binder" used in present invention results in high conductivity and high energy density, since it can be converted to nitride or carbon nitride after pyrolysis in an inert or reduced atmosphere; and (5) reducing the cost and expenses of the manufacturing process.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is directed to nitride, carbonitride and oxycarbonitride composite electrode and a method for fabrication the same.

High surface area transition metal nitride, carbonitride and oxycarbonitride are produced by sintering template modified gel and/or aerogel in an inert or reduced atmosphere, i.e. sintering under the flow of nitrogen, argon, ammonia, CO or carbon hydride. The electrode powder fabricated in said method exhibit high energy and power density.

Figure 1:
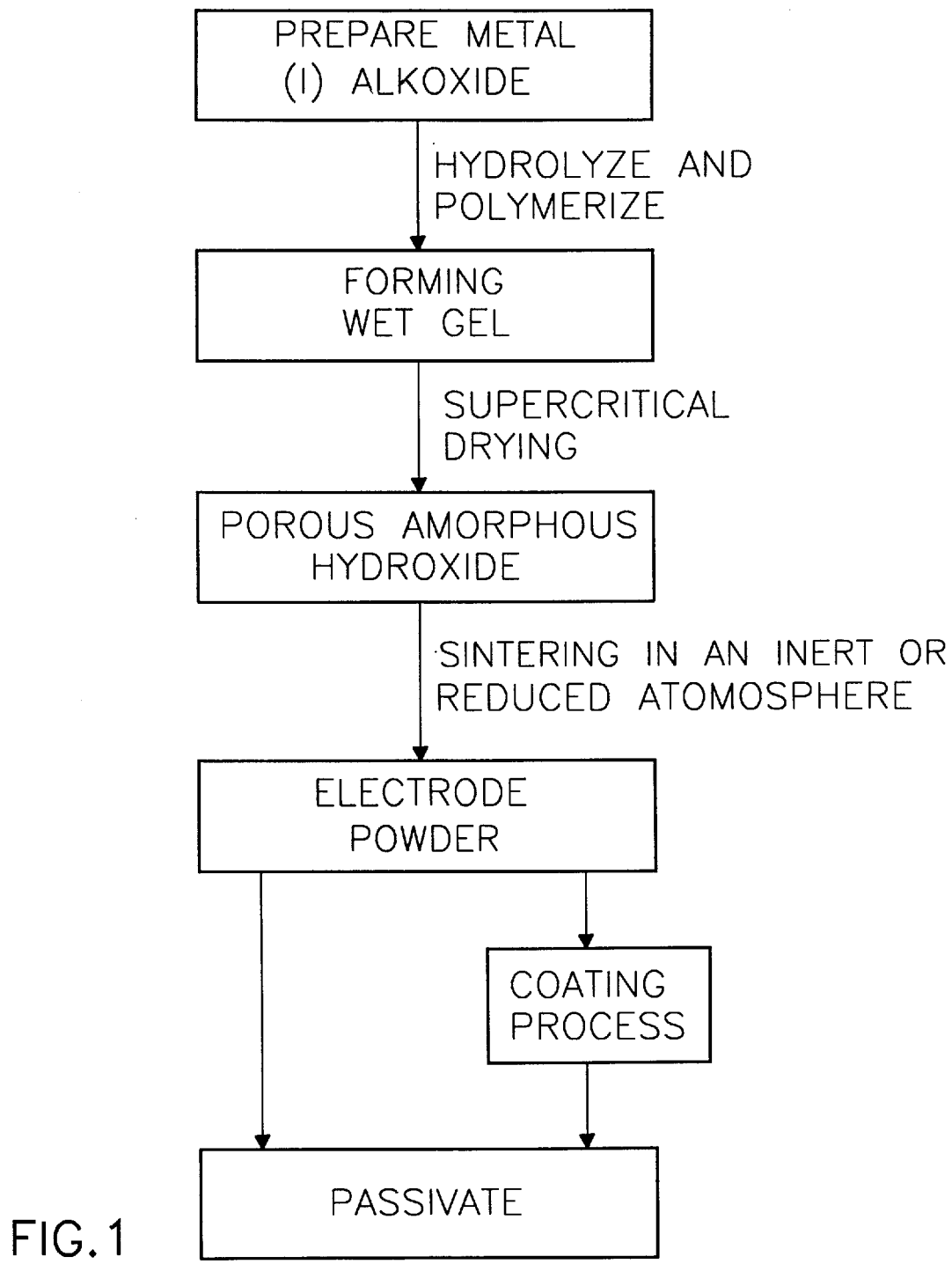
FIG. 1 is a block flow diagram illustrating supercapacitor produce procedure starting with metal alkoxide (route I).

The wet gel is prepared in two methods. One is start from transition metal alkoxide or alkoxyl chloride. Referring to FIG. 1, metal alkoxide or alkoxyl chloride is prepared by reaction metal or chloride to alcohol. The dissolved transition metal alkoxide or metal alkoxyl chloride is then hydrolyzed by the addition of water. The amount of water added in the process affects the pore size and surface area of the inorganic oxide aerogel formed.

The aerogels can be prepared in acidic, neutral or basic medium generally depending on the acidity or basicity of the metal oxide formed. Since the gel generally has a neutral pH, to enhance hydrolysis, a catalytic amount of an acid or base is desirably added in most instances. The addition of a catalytic amount of an acid or base during or simultaneous with the addition of water affects the pore size and surface area of the product formed as indicated above.

Any organic or inorganic acid or base can be utilized, as for instance, HCl, HF, acetic acid, 2-ethylhexanoic acid, $HNO_3$, $H_2SO_4$, and $NH_3$, all of which are suitable for use within the knowledge in the art to determine the more favorable conditions for producing the desired aerogel. An excess in acid or base may cause rapid precipitation of the gel which would also cause shrinkage in the gel or cause excess ions to remain in the final product which can be undesirable.

Figure 2:
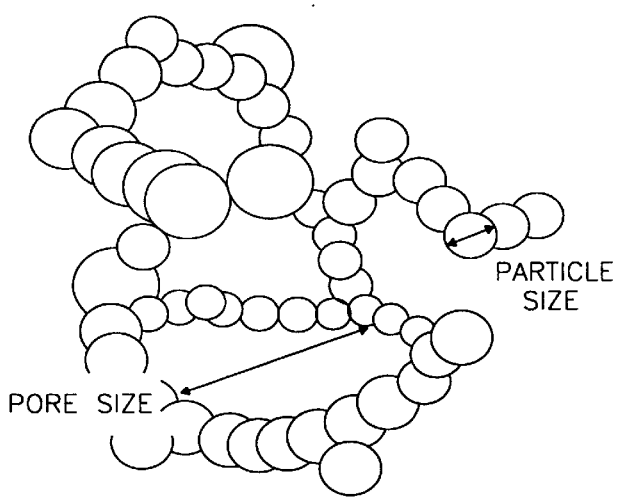
FIG. 2 illustrates the porous structure of aerogel materials.

Metal alkoxide or alkoxyl chloride is hydrolyzed and polymerized with water liberated. In this manner, a number of small kernels are formed whose interior is constituted by amorphous inorganic oxide and whose outer surface displays organic alcohol groups. In due course the kernels are coupled by inorganic oxide linkages to form a space net (see FIG. 2) up on aging.

Figure 3:
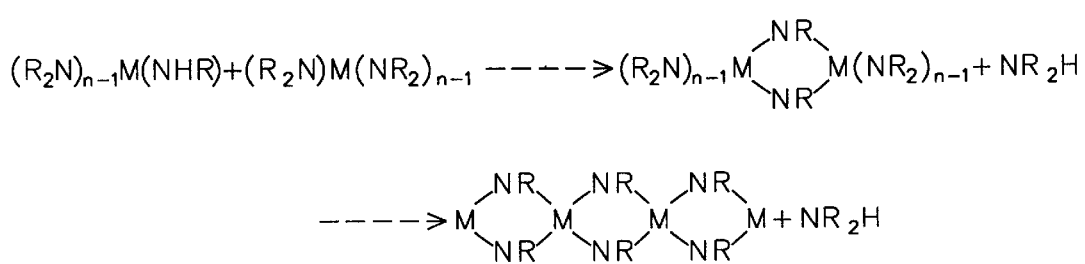
FIG. 3 present said aminolysis and polycondensation of metal alkoxylamides to form polymeric precursor.
Figure 4:
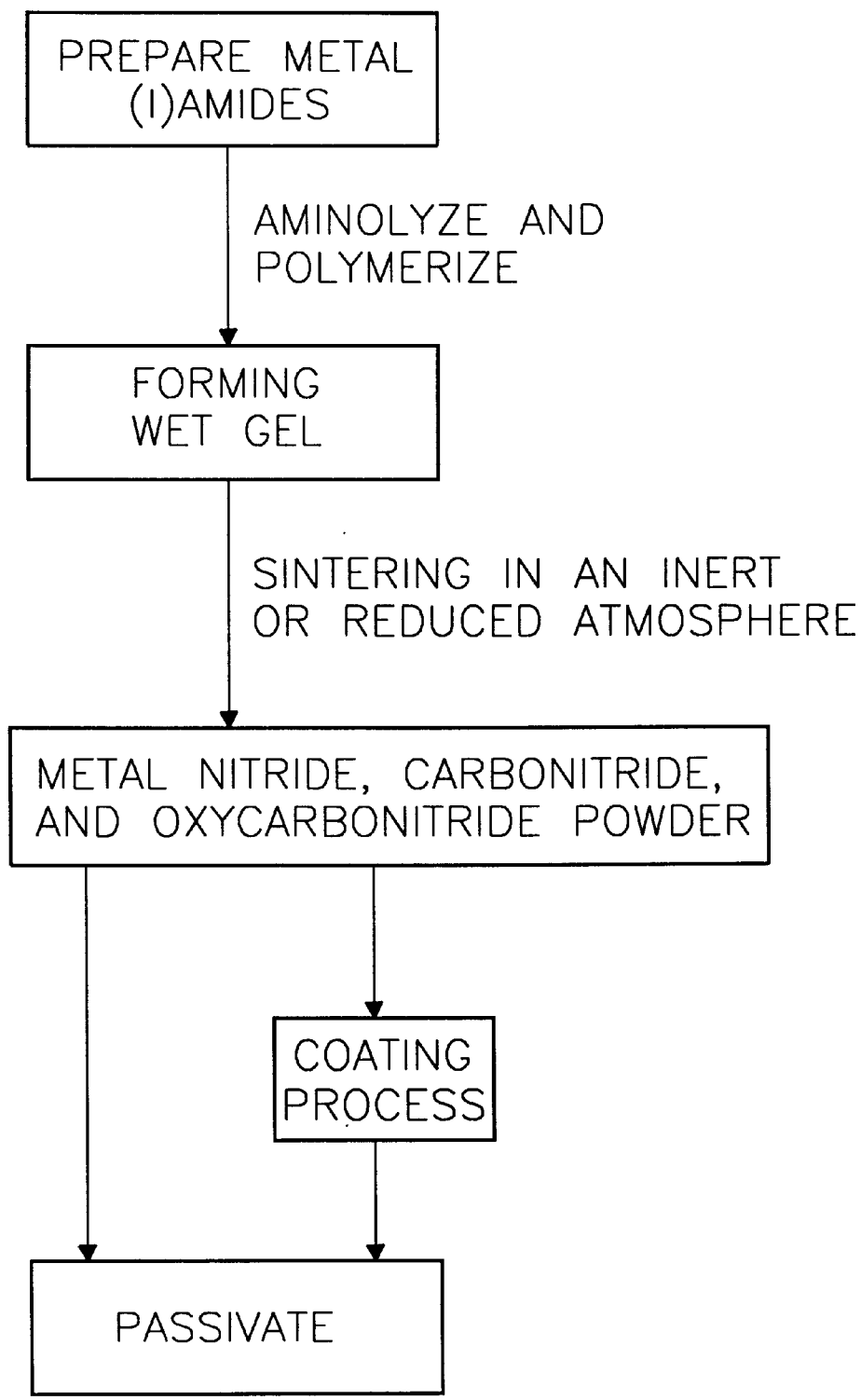
FIG. 4 is a block flow chart on supercapacitor assembly procedure starting with metal amide (route II).

The second method to prepared wet gel is described in FIGS. 3 and 4. Metal alkylamides are used as the starting chemicals. In present invention, metal alkylamides are prepared by either electrolysis or chemical routes, described as follows:

1. By Electrolysis

Metal alkylamides are synthesized by electrolysis of metal foils in an organic electrolyte. The electrolyte contains a primary amine, an aphotic solvent such as acetonitrile, and a tetra-alkyl ammonium salt like tetrabutylammonium bromide. The salt is necessary as supporting electrolyte in order to increase the conductivity of the electrolyte solution. Tetrabutylammonium salts are readily dissolved in polar organic solvents and do not contaminate the final products with any cation impurities.

Metal foils are used as both anodes and cathodes. The reactor vessel is continuously flushed with nitrogen gas. A voltage is applied to the electrodes. Depends on the type of amines used in the electrolyte, the current density ranged from 5 to 20 $mA/cm^2$. The polarity of the DC voltage is reversed from time to time in order to achieve a uniform dissolution of both cathodes and anodes. Metal alkylamides, $M(NHR)_n$, is formed.

After the electrolysis reaction is stopped, the solution in the reactor is filtered and transferred into a gas-tight flask. A vacuum of about 10 mbar is attached to the flask. Polymerization is accelerated by heating up to 150° C.

2. Via Chemical Route

Variety of metal dialkylamides precursors can be synthesized through substitute reaction of metal chloride to lithium dialkylamide. The lithium dialkylamides are prepared by slowly adding LiBut into $HNR_2$ under the stirring in a solvent. The mixture is reflux under stirring and with ice cooling in the nitrogen atmosphere. The white precipitation of lithium dialkylamides are then obtained.

The transition metal chloride is then reacted with lithium dialkylarnides in a mutual solvent to form the desired product. The product is then separated by centrifuge and the metal dialkylamide is further purified by vacuum distillation. The final product, in general, is a mixture of dialkylamides with different metal valences. The wet gel can be formed by aminolysis and polycondensation, as shown in FIG. 3. The ligand, R, acts as template in the wet gel. The pore size is related to the size of the R ligand.

Before supercritical drying, the original solvent is exchanged by suitable solvent which should be the same as or be compatible with fluid used for supercritical drying after certain aging time.

The treatment of the wet gel for conversion to aerogel constitutes the second major step and is carried out, in practice, in an autoclave. The solvent ladened gel or colloid which is formed in the practice of the invention is placed in an autoclave where it is contacted with a fluid above its critical temperature and pressure by allowing the supercritical fluid to flow through the material solid and liquid until the solvent is no longer being extracted by the supercritical fluid. Various fluids can be utilized at their critical temperature and pressure. For instance, ammonia, methylamine, acetonitrile, dimethylamine, ethylamine and carbon dioxide, and alcohols.

The dried aerogel, transition metal hydroxide or polymerized amide, is fired in an inert atmosphere or reduced atmosphere to a high temperature to remove all the organic compounds and to convert the precursor into nitride, carbonitride or oxycarbonitride.

The present invention process can produce not only the desired pore size in the powder but also reduce the pore sizes that are either too large or too small, which are undesirable. For example, if the pore size is too small, it will severely limit the accessibility by the electrolyte; and if the pore size is too large, then it will reduce the specific surface area of the electrode in a given unit weight or volume. By utilizing the bulky organic ligand as template, the present invention process is able not only to control the pore size to a desired size but also to narrow the pore size distribution. The template method also significantly reduces the costs and expenses of the manufacturing process.

The formula of invented electrode material can be written in general $MO_aC_bN_c$, where M represent metal, a, b, and c decimal values, one or two of them can be zero, and the sum: a+b+c can be less than or equal about one.

Figure 5:
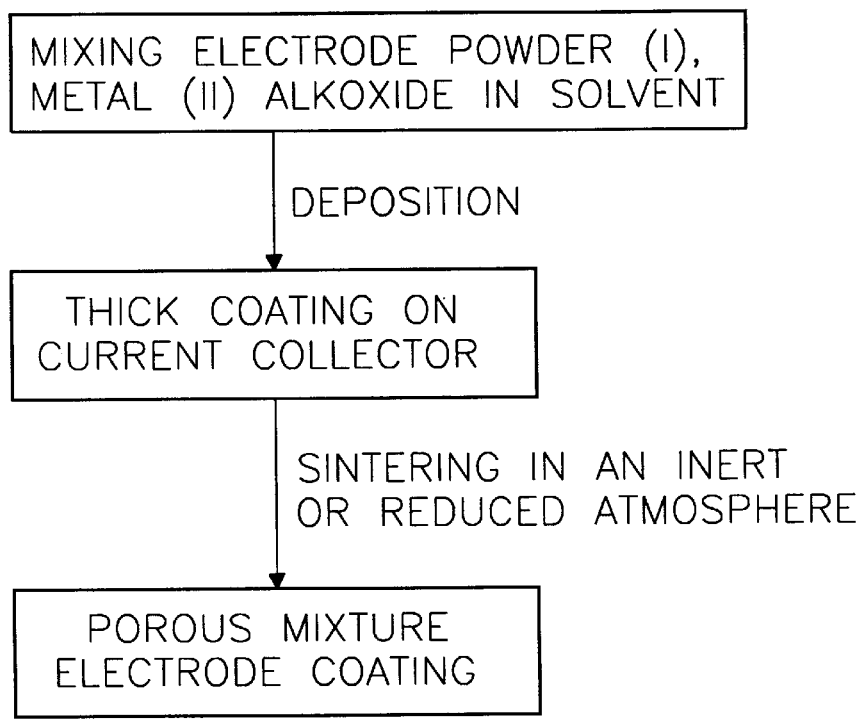
FIG. 5 Electrode coating process via spin- or dip-coating.

The nitride, carbonitride or oxycarbonitride powder fabricated as indicated above can be passivated into capacitor using conventional binder. The disadvantage of using conventional binder is its resistivity and non-electrochemically active. The present invention provides a method for preparation of porous electrode coating on current collector using "sol gel" as binder, which is converted to nitride, carbonitride or oxide after pyrolysis in an inert or reduced atmosphere (see FIG. 5). Sol gel binder can be metal alkoxide, partially hydrolyzed metal alkoxide or hydrolyzed metal alkoxide. The metal in this binder can be the same or different metal in powderized electrode materials.

For example, a viscous sol is prepared by mixing tantalum alkoxide with molybdenum nitride powder using isopropanol as solvent. The sol is supplied onto the current collector by spin-coat, dip-coat or spray-coat. The coating is then sintered under an inert gas or reduced gas flow to high temperature. This method can be used to increase cohesion of electrode and adhesion to the current collector, as indicated by Deng. This method can make binder a conductive binder with high surface area.

To make a composite electrochemical capacitor electrode, the material bound by the gel may be an already pyrolyzed metal (N,C,O) aerogel powder, or microsphere, or a powderized high surface area nitride, carbonitride and oxycarbonitride as well as active carbon, aerogel carbon powder. The advantage over using conventional binders is that the sol gel binder is conductive (greatly increasing the resultant composite's conductivity with respect to polymer based binders such as Teflon®, EDPM, or PVDF), and is electrochemically active (the binder also has capacity, and adds to the total electrochemical capacitance), and provides a continuous electrode network which enhances the energy and power density.

The process of this invention using already fired powder with a binder can be compressed to yield a composite coating electrode with high specific surface area. Manufacturability of present invention is enhanced by allowing precursor materials to be span, dipped and spread in thicker coating on substrate which increase the energy density of packed capacitor. The simplicity of manufacture over prior arts is significant. Improved capacities per volume and per weight may be achieved by applying this method when compared to prior arts.

Figure 6:
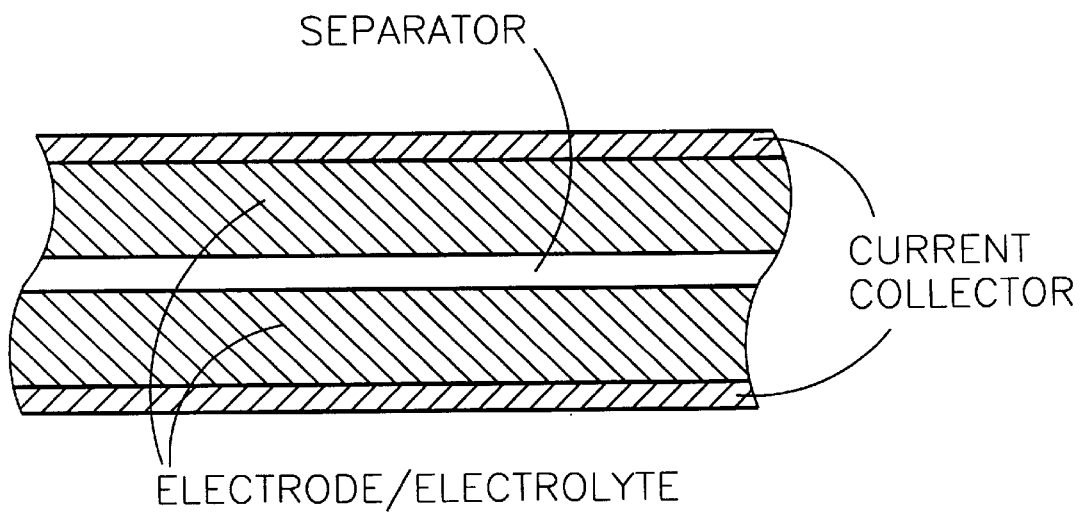
FIG. 6 electrochemical capacitor unit cell in accordance with the invention.

Referring to FIG. 6, there is illustrated an electrochemical capacitor unit cell in accordance with the invented electrode material, wherein each of the electrodes comprises a metal foil electrode substrate having a porous, electronically conductive, said electrode coating on each surface. The stacked assembly further includes a porous separator layer between each of the electrodes, the separator layer being made of a material that is electronically non conductive. Aqueous or non-aqueous electrolyte is provided by soaking into porous electrode under vacuum.

The following examples are offered by way of example and not by way of limitation.

EXAMPLE 1

Preparation of Tungsten and Molybdenum Alkoxyl Chlorides

Tungsten and molybdenum alkoxyl chloride are synthesized via reaction of chloride to alcohols. In order to separate byproduct, $NH_3$ is used to form a white precipitate. Molybdenum alkoxyl chloride is prepared by adding $MoCl_5$ into excess isopropanol through an addition funnel. The reaction is exothermic and very fast. After the reaction stopped (container cool down), flowing $NH_3$ into the reactor to form white precipitate. The chlorines were only partially replaced by isopropoxide, as shown in the following equation:

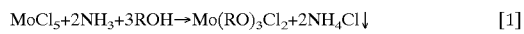

$$MoCl_5+2NH_3+3ROH \rightarrow Mo(RO)_3Cl_2+2NH_4Cl\downarrow \quad [1]$$

Tungsten alkoxyl chloride is synthesized via reaction of chloride($WCl_6$) to alcohols. The reduction of W(VI) to W(V) is observed with formation of tungsten dichloride trialkoxide as main product. The white precipitate is formed by flowing $NH_3$ into the reactor.

The white precipitate ($NH_4Cl$) was separated from product solution by centrifuge.

EXAMPLE 2

Hafnium Alkylamides Prepared via Electrolysis

Hafnium (Hf) alkylamides can be synthesized by electrolysis of Hf metal foils in an organic electrolyte. The electrolysis reaction was carried out in a 2L glass reactor. Hafnium metal foils (10 cm×7.5 cm×0.05mm) are used as both anodes and cathodes. Four Hf foils were used in each reaction. The distance between two electrodes is about 1 mm. The reactor vessel is continuously flushed with nitrogen gas. A voltage of 15~20V was applied to the electrodes. Depends on the type of amines used in the electrolyte, the current density ranged from 5 to 20 $mA/cm^2$. The polarity of the DC voltage was reversed from time to time in order to achieve a uniform dissolution of both cathodes and anodes. The reaction usually continued for about a day until most of the HF foils dissolved away.

At the cathode, the resultant hydrogen causes gas bubbles to form. The cathodic decomposition of the aminoalkane and the deposition of metallic hafnium at the cathode could not be observed.

The composition of the electrolyte solutions used in the electrolysis reactions is 400 ml amine, 125 ml acetonitrile, and 11 g of tetrabutylammonium bromide. The physical properties of the three primary amines and their effects on the electrolysis reactions are summarized in Table 1 below.

TABLE 1

Physical Properties of Primary Amines and Their Effects on the Reaction Parameters in Electrolysis of Hafnium Metal Foils

| Amine | M.W. (g/mole) | b.p. (° C.) | Density (g/cm$^3$) | Electrolysis Potential (V) | Current Density (mA/cm$^2$) |
|---|---|---|---|---|---|
| Propylamine | 59.1 | 47.8 | 0.717 | 15 | 18 |
| Butylamine | 73.1 | 77.8 | 0.741 | 20 | 8 |
| Amylamine | 87.2 | 104.4 | 0.755 | 20 | 5 |

It is apparent that as the alkyl group of the amines get bigger, the conductivity of the electrolyte decreases. It required higher potential to drive the electrolysis reaction. The current density of the reaction also dropped drastically when the amine in the electrolyte is changed from propylamine to butylamine. Therefore, the electrolysis rates are much slower when butylamine and amylamine are used.

EXAMPLE 3

Synthesis of Titanium Dialkylamide

As indicated in prior art, the lower dialkylamide produce polymeric derivatives owing to covalency expansion of the metal causing inter molecular metal-nitrogen bonding. With the higher dialkylamides, volatile monomeric derivatives occur because of the pronounced stearic factors involved.

The lithium diethylamide is prepared by slowly adding LiBut into $HNEt_2$ under the stirring in hexane. The mixture is reflux under stirring and with ice cooling for 20 hours under the nitrogen flow. The white precipitation of lithium diethylamide is then obtained:

$$LiBut + HNEt_2 \rightarrow LiNEt_2 + Hbut \quad [2]$$

The titanium tetrachloride is then reacted with lithium diethylamnides in a mutual solvent, such as benzene and tetrahydrofIran (THF) to form the desired product:

$$TiCl_4 + 4LiNEt_2 \rightarrow Ti(NEt_2)_4 + 4LiCl \quad [3]$$

The titanium chloride is slowly added to a suspension of the equivalent quantity of lithium diethylamide in a mutual solvent at room temperature with ice cooling and under the stirring for more than 15 hours until the intermediate product disappeared. The titanium product is then separated by centrifuge and the titanium diethylamide is further purified by vacuum distillation. The final product is a brownish liquid.

It should be mentioned here that the final product, in general, is a mixture of dialkylamides with different metal valences.

EXAMPLE 4

Hafnium-amide Aerogel from Polymerized Alkylamides

In the preparation of wet gels, hafnium butylanide is first dissolved in a solvent such as hexane. Propylamine is then added to the solution with hafnium to propylamine mole ratios of 1:8. The aminolysis of hafnium butylamine with a primary amine is a quite slow process. The remained alkyl groups after aminolysis serve as a template in the wet gel. The porosity is maintained upon firing to high temperature (900 to 1300 C) under the nitrogen flow. The surface area of the aerogels is in the range of 90 to 145 m$^2$/g.

EXAMPLE 5

Molybdenum Hydroxide Aerogel

One way of synthesis of nitride material is to convert oxide by nitridation at high temperature under ammonia flow. For synthesis of high surface area nitride materials, hydroxide gel is formed first by adding very small amount of water and ethanol to molybdenum isopropoxide chloride under stirring. Gellation takes about one hour. The gel is aged at room temperature in an-sealed container for days.

Solvent exchange with ethanol is needed to remove extra water and isopropanol. The wet gel immersed in ethanol in an container is placed inside autoclave. Ethanol is used also as supercritical fluid for drying. The wet gel is dried above supercritical point of ethanol, ($T_c$=243° C., $P_c$=6.36 Mpa). After drying the autoclave is cold down slowly to room temperature under the pressure. The pressure is then released. The dried molybdenum oxide aerogel is nitrated at 750° C. under ammonia flow for 2 to 5 hours.

EXAMPLE 6

Electrode Coating on Current Collector

The composite electrode coatings is deposited on titanium foils by spin-coating.

The titanium foil is polished before deposition and ultrasonically cleaned in acetone and isopropanol. Titanium foil is used as current collector. The viscous sols are prepared by mixing electrode powder, such as nitride, carbonitride or oxycarbonitride powder, with alkoxide solution, such as tantalum ethoxide, BaTi isopropoxide, or molybdenum isoproxide chloride solution. As described above, deposition of composite electrode coating is to enhance cohesivity and adhesivity of unit cell. The sol is supplied onto the titanium and span at 1000 RPM for 1 minute. The coating is then sintered under ammonia flow to 650 to 750° C. for 2 hours. The weight percentage of tantalum oxide, barium titanate is in the range of 5 to 10%.

EXAMPLE 7

Capacitance of Electrochemical Capacitors

The button type capacitor unit cell is used for measurement of capacitance. $H_2SO_4$ solution was used as the electrolyte for most of samples. The electrochemical behavior of the electrode material is examined by cyclic voltammetry. Cyclic voltammetry measurement of the unit cells is performed using a potentiostat (EG&G PARC Model 362). The specific capacitance of electrode material was calculated from both constant current or constant voltage sweep-rate curves:

1. the charge/discharge profile using the equation:

$$C = I/(dV/dt) \quad [4]$$

The slope of the discharge curve (dV/dt) was taken from the linear section between 0.4 and 0 volt.

2. In a cyclic voltammetry experiment at a voltage sweeprate $$s = k\, dV/dt \quad [5]$$

(where k is a constant) the average capacitance is calculated by dividing average current by s.

The calculated unit cell capacitance were converted to single electrode capacitance by multiplying the calculated values by 4, since two electrodes in the unit cell were connected in series and the capacitance was divided by the two electrodes total weight. Table 2 below listed the specific capacitance of some of electrode materials of this present invention. The specific capacitance and energy density is calculated based on per weight of electrode material. The voltage window of invented electrode materials are larger than 1 volt in sulfuric acid electrode.

TABLE 2

Electrochemical Properties of Electrode Materials

| Electrode | Electrolyte | Specific Capacitance (F/g) | Energy Density (wh/kg) |
| --- | --- | --- | --- |
| $Mo_2N$ | Sulfuric Acid | 280–320 | 9–11 |
| W(C, N) | Sulfuric Acid | 120–200 | 4–7 |
| Hf(O, C, N) | Sulfuric Acid | 40–50 | 1–2 |
| Zr(O, C, N) | Sulfuric Acid | 20 | 0.7 |

Defined broadly, the present invention is a method of fabricating high specific surface area electrode, comprising the steps of: (a) preparing a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B); and (b) forming a composite layer on a substrate, where the composite layer is fabricated from said porous powder.

Defined alternatively, the present invention is a high specific surface area electrode comprising a substrate and a composite layer fabricated from a porous powder having metal occupied in a first (A) lattice and heteroatom occupied in a second -B) lattice, wherein the metal is selected from the Groups IV, V, and VI of the Periodic Table and the heteroatom is selected from the group of Oxygen (O), Nitrogen (N), Carbon (C) and Boron (B).

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method of fabricating high specific surface area electrode, comprising the steps of:
   a. preparing a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and further comprises the step of utilizing a bulky organic ligand as a template for controlling the pore size and pore size distribution of the powder; and
   b. forming a composite layer on a substrate, where the composite layer is fabricated from said porous powder.

2. The method as defined in claim 1, wherein said step of preparing said porous powder further comprises the step of synthesizing metal-alkoxide.

3. The method as defined in claim 2, further comprising the step of hydrolyzing metal-alkoxide.

4. The method as defined in claim 3, further comprising the step of polymerizing metal-alkoxide.

5. The method as defined in claim 2, further comprising the step of forming a wet gel of synthesized metal-alkoxide.

6. The method as defined in claim 5, further comprising the step of supercritical drying of said wet gel.

7. The method as defined in claim 1, wherein said step of preparing said porous powder further comprises the step of sintering in an inert atmosphere.

8. The method as defined in claim 1, wherein said step of preparing said porous powder further comprises the step of sintering in a reduced atmosphere.

9. The method as defined in claim 1, wherein said step of forming said composite layer on said substrate further comprises the step of depositing a sol prepared by mixing said porous powder with a solution onto said substrate.

10. The method as defined in claim 9, wherein said sol acts as a binder which is converted into a continuous network of electrode material after thermal treatment to provide enhanced energy and power density.

11. The method as defined in claim 9, wherein said solution is tantalum alkoxide.

12. A high specific surface area electrode fabricated according to the method as defined in claim 1.

13. The high specific surface area electrode as defined in claim 12, wherein said powder is fabricated by utilizing a bulky organic ligand as a template for controlling the pore size and pore size distribution of said powder.

14. A high specific surface area electrode comprising a substrate and a composite layer fabricated from a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and wherein the powder is fabricated by utilizing a bulky organic ligand as a template for controlling the pore size and pore size distribution of the powder.

15. The high specific surface area electrode as defined in claim 14, wherein said composite layer fabricated from said porous powder is coated onto said substrate by a sol gel binder which is converted into a continuous network of electrode material after thermal treatment to provide enhanced energy and power density.

16. The high specific surface area electrode as defined in claim 14, wherein said metal is selected from the group consisting of Molybdenum (Mo), Tungsten (W), Hafnium (Hf) and Zirconium (Zr).

17. A method of fabricating high specific surface area electrode, comprising the steps of:

a. preparing a porous powder having metal occupied in a first (A) lattice and heteroatom occupied in a second (B) lattice, wherein the metal is selected from the Groups C, V, and VI of the Periodic Table and the heteroatom is selected from the group of Oxygen (O), Nitrogen (N), Carbon (C) and Boron (B), and further comprising the step of synthesizing metal-amide; and b. forming a composite layer on a substrate, where the composite layer is fabricated from said porous powder.

18. The method as defined in claim 17, further comprising the step of aminolyzing said metal-amide.

19. The method as defined in claim 18, further comprising the step of polymerizing said metal-amide.

20. The method as defined in claim 17, further comprising the step of forming a wet gel of synthesized metal-amide.

21. A high specific surface area electrode fabricated according to the method as defined in claim 17.

22. A method of fabricating high specific surface area electrode, comprising the steps of:

a. preparing a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and wherein the porous powder is a metal oxycarbonitride; and b. forming a composite layer on a substrate, where the composite layer is fabricated from said porous powder.

23. A high specific surface area electrode fabricated according to the method as defined in claim 22.

24. A method of fabricating high specific surface area electrode, comprising the steps of:

a. preparing a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and wherein the porous powder is a metal alkylamides powder synthesized by exchange reaction of metal chloride with lithium alkylamides; and b. forming a composite layer on a substrate, where the composite layer is fabricated from said porous powder.

25. A high specific surface area electrode fabricated according to the method as defined in claim 24.

26. A method of fabricating high specific surface area electrode, comprising the steps of:

a. preparing a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B); and b. forming a composite layer on a substrate, where the composite layer is fabricated from said porous powder, and further comprises the step of pressing a mixture of said porous powder and a binder to said substrate.

27. A high specific surface area electrode fabricated according to the method as defined in claim 26.

28. A high specific surface area electrode comprising a substrate and a composite layer fabricated from a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and wherein the porous power is prepared by synthesizing metal-amide.

29. A high specific surface area electrode comprising a substrate and a composite layer fabricated from a porous metal oxycarbonitride powder having metal occupied in a first (A) lattice and heteroatom occupied in a second (B) lattice, wherein the metal is selected from the Groups IV, V, and VI of the Periodic Table and the heteroatom is selected from the group of Oxygen (0), Nitrogen (N), Carbon (C) and Boron (B).

30. A high specific surface area electrode comprising a substrate and a composite layer fabricated from a porous metal alkylamides powder synthesized by exchange reaction of metal chloride with lithium alkylamides and having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B).

31. A high specific surface area electrode comprising a substrate and a composite layer fabricated from a porous powder having metal occupied in a first (A) lattice and heteroatom occupied in a second (B) lattice, wherein the metal is selected from the Groups IV, V, and VI of the Periodic Table and the heteroatom is selected from the group of Oxygen (O), Nitrogen (N), Carbon (C) and Boron (B), and wherein the composite layer is formed on the substrate by pressing a mixture of the porous powder and a binder to the substrate.

* * * * *